Figure 1:
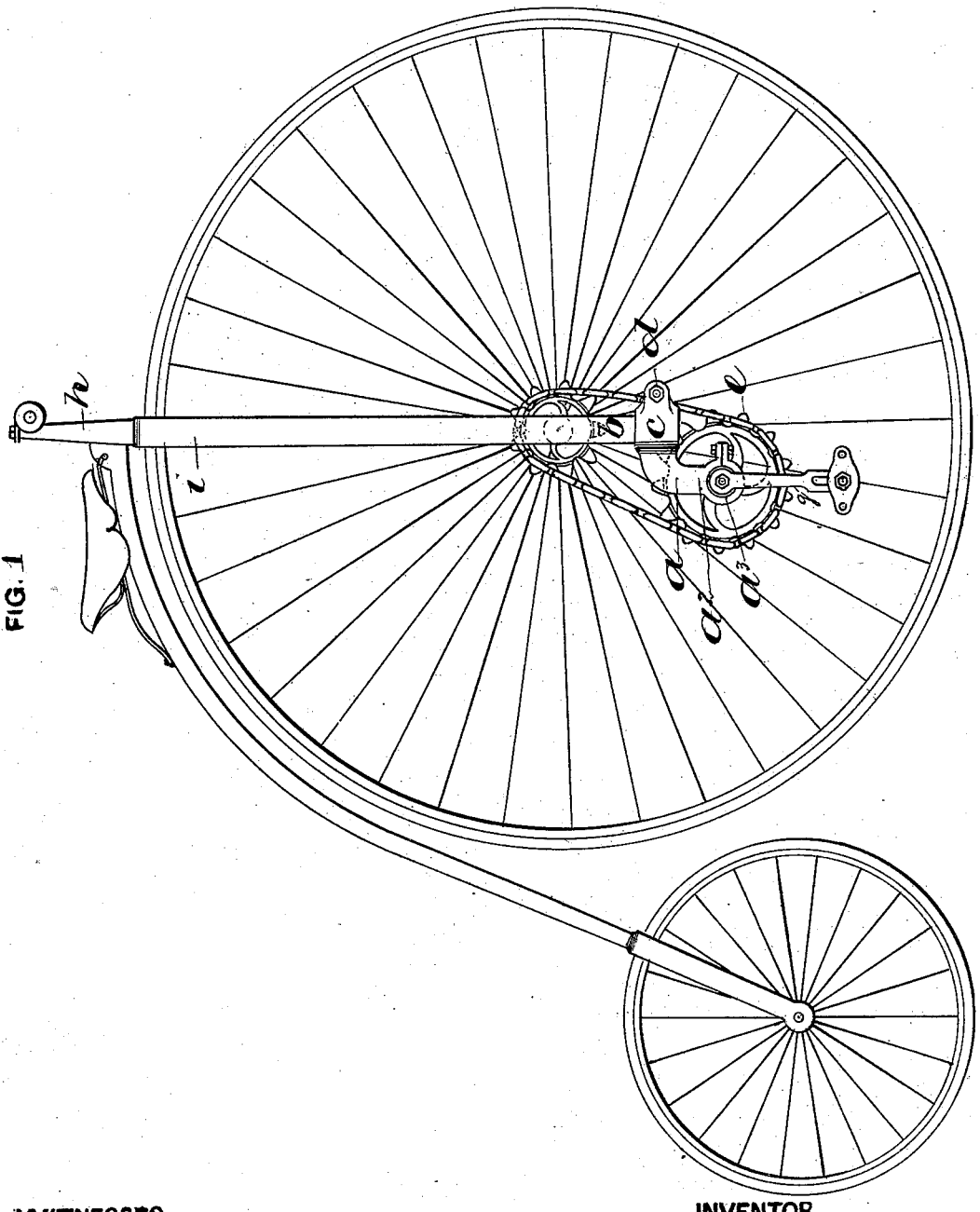

(No Model.) 2 Sheets—Sheet 1.

B. KELSEY.
BICYCLE.

No. 359,448. Patented Mar. 15, 1887.

WITNESSES
Henry L. Sherrett
Miles E. Hughes

INVENTOR
Benjamin Kelsey
Connolly Bros
attys

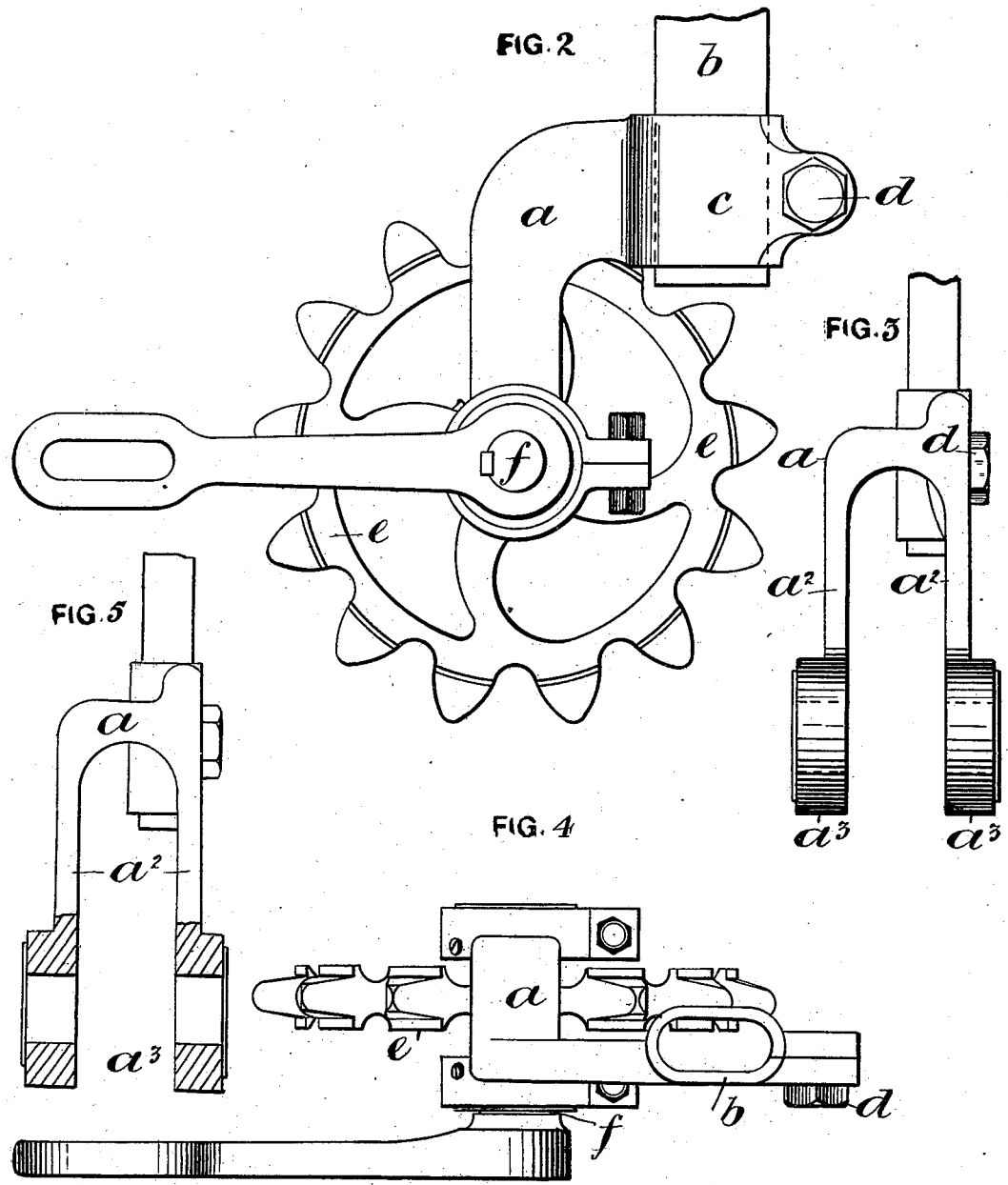

UNITED STATES PATENT OFFICE.

BENJAMIN KELSEY, OF BIRMINGHAM, COUNTY OF WARWICK, ENGLAND.

BICYCLE.

SPECIFICATION forming part of Letters Patent No. 359,448, dated March 15, 1887.

Application filed January 26, 1886. Serial No. 189,857. (No model.) Patented in England August 19, 1884, No. 11,420, and December 21, 1885, No. 15,681.

*To all whom it may concern:*

Be it known that I, BENJAMIN KELSEY, a subject of the Queen of Great Britain, and residing at Birmingham, England, manufacturer, have invented Improvements in Bicycles and other Velocipedes, (for which I have applied for two Letters Patent in Great Britain, one of which is dated the 19th day of August, 1884, No. 11,420, and the other is dated the 21st day of December, 1885, No. 15,681,) of which the following is a specification.

My invention has reference to bicycles; and it consists, first, in making the bracket which carries the chain-wheel adjustable, so as to adjust the chain-wheel to the length of the driving-chain without moving the axis of the said wheel, thus allowing the driving or chain wheel to remain true with the head or with the general framing of the machine; secondly, a means of imparting steadiness to the chain-wheel by providing the said machine with two separate bearings, between which bearings the driving chain-wheel works, thereby getting rid of all oscillation or uneven wear of the axial parts by producing an extended bearing wherein the axis of the driving chain-wheel works without any tendency to lateral motion.

Having described the nature of my invention, I will now proceed to describe the manner in which the same is to be performed.

Figure 1 is a side elevation of a bicycle provided with improvements constructed according to my invention. Fig. 2 is a side elevation, upon a larger scale, of an adjustable forked bearing-bracket made according to my improvement. Fig. 3 is an end view. Fig. 4 is a plan; and Fig. 5 is the same, with the bushes of the forked bearings in section.

$a$ is a depending forked bearing-bracket adjustable at its upper end upon one of the limbs of the fork $b$. The affixing and securing of the said bracket to the fork is effected by the clip formation $c$, which embraces the fork and is secured thereto by the closing or drawing to of the divided sides by means of the screw bolt or pin $d$.

The lower depending part of the bracket $a$ is forked or divided, so as to form two separate bearing-arms, $a^2$ $a^2$, between which the chain-wheel $e$ rotates, and the extreme lower portions of these arms are formed into bossed bearings $a^3$ $a^3$, which support the crank-axle $f$ and chain-wheel $e$. $g$ is the crank secured upon the axis $f$. By these means an adjustable bracket provided with two separate bearings for the pedal or chain-wheel, and crank-axis is thus secured, which latter prevents any possibility of the crank axis or wheel rocking within its bearings, thereby producing steadiness of motion and uniformity of wear.

Having thus described my invention, I claim as new and desire to secure by Letters Patent—

1. The combination, with the fork of a bicycle, of adjustable gearing-brackets attached to both legs of said fork, said brackets having their depending ends bifurcated and forming two separate axle-supports for the gear-wheels, substantially as shown and described.

2. The combination, with the bicycle-fork leg $b$, of L-shaped depending adjustable bracket $a$, having clip $c$ and double bearing-arms $a^2$, and bossed bearings $a^3$, substantially as shown and described.

Signed this 22d day of December, 1885.

BENJAMIN KELSEY.

Witnesses:
HENRY SKERRETT,
MILES E. HUGHES,
*Both of Birmingham.*